US012292592B2

(12) United States Patent
Hudman et al.

(10) Patent No.: US 12,292,592 B2
(45) Date of Patent: *May 6, 2025

(54) HEAD-MOUNTED DISPLAY DEVICES WITH NON-RECTANGULAR BACKLIGHT

(71) Applicant: Valve Corporation, Bellevue, WA (US)

(72) Inventors: Joshua Mark Hudman, Issaquah, WA (US); Douglas Vanderwel, Kent, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,679

(22) Filed: Nov. 20, 2023

(65) Prior Publication Data

US 2024/0184035 A1 Jun. 6, 2024

Related U.S. Application Data

(63) Continuation of application No. 17/711,856, filed on Apr. 1, 2022, now Pat. No. 11,846,798.

(51) Int. Cl.
G06F 1/16 (2006.01)
F21V 8/00 (2006.01)

(52) U.S. Cl.
CPC ........... *G02B 6/0061* (2013.01); *G02B 6/003* (2013.01); *G02B 6/0036* (2013.01); *G02B 6/0043* (2013.01); *G02B 6/0068* (2013.01); *G06F 1/163* (2013.01)

(58) Field of Classification Search
CPC ............ G02F 1/133615; G02B 6/0043; G02B 6/0061; G02B 6/0068; G02B 6/0035; G02B 6/0036; G02B 6/004
See application file for complete search history.

(56) References Cited

U.S. PATENT DOCUMENTS

| | | | |
|---|---|---|---|
| 4,737,896 A | 4/1988 | Mochizuki et al. | |
| 5,390,436 A | 2/1995 | Ashall | |
| 5,521,797 A | 5/1996 | Kashima et al. | |
| 7,766,507 B2 | 8/2010 | Nakajima | |
| 8,366,308 B2 * | 2/2013 | Chiu | G02B 6/0031 362/621 |
| 8,702,295 B2 * | 4/2014 | Lin | G02B 6/0083 362/616 |
| 8,845,170 B2 | 9/2014 | Kim et al. | |

(Continued)

OTHER PUBLICATIONS

International Search Report and Written Opinion, mailed Apr. 27, 2023, for International Patent Application No. PCT/US2023/016865. (14 pages).

*Primary Examiner* — Ismael Negron
(74) *Attorney, Agent, or Firm* — Seed IP Law Group LLP (57) ABSTRACT

A backlight assembly includes a display panel (such as a liquid crystal display), an optics system for focusing a portion of the display onto an eye of a user, a light guide, a plurality of extraction features positioned on a surface of the light guide, and at least one laser diode for directing light into the light guide. The light guide is sized and dimensioned to illuminate only a portion of the display that is focused by the optics system; with the plurality of light extraction features configured to diffuse light toward the display panel for back illuminating the display panel.

24 Claims, 7 Drawing Sheets

(56) References Cited

U.S. PATENT DOCUMENTS

| | | | |
|---|---|---|---|
| 9,703,031 B2 | 7/2017 | Sahlhoff et al. | |
| 10,061,073 B2 | 8/2018 | Richards et al. | |
| 10,088,685 B1 * | 10/2018 | Aharoni | G02B 6/0076 |
| 10,162,181 B2 | 12/2018 | Webster et al. | |
| 10,416,370 B2 | 9/2019 | Diana et al. | |
| 10,422,943 B2 | 9/2019 | Munoz Fernandez et al. | |
| 10,775,544 B2 | 9/2020 | Osumi et al. | |
| 2013/0100695 A1 | 4/2013 | Yankov et al. | |
| 2018/0364409 A1 | 12/2018 | Lee et al. | |

* cited by examiner

HEAD-MOUNTED DISPLAY DEVICES WITH NON-RECTANGULAR BACKLIGHT

BACKGROUND

Technical Field

The disclosure relates generally to backlights for displays and, in at least some implementations, backlights for use in close-eye or head-mounted displays.

Description of the Related Art

A backlit information display, such as a liquid crystal display ("LCD"), comprises several components. Two of those components are the display matrix, which obstructs light on a highly granular sub-pixel basis to create a displayed image, and a light source or backlight. The light source is typically positioned behind the display matrix and illuminates the displayed image. For a color display, the backlight typically emits broad spectrum light, i.e., white light.

Traditionally, the light source used in backlit displays was often one or more cold cathode fluorescent lamps ("CCFLs"). Physically, CCFLs appear somewhat like miniaturized versions of the fluorescent light tubes used in commercial office buildings. However, CCFLs produce light in a different manner than those commercial fluorescent lights. More recently, the use of CCFLs has given way to the use of one or more light emitting diodes ("LEDs") as the light source in information displays. LED technology presently is the most common backlight type for LCD displays.

Backlights may generally be classified into two types, namely, edge-type backlights providing light to a display panel through a side surface of the display panel and direct-type backlights providing light to a display panel through a bottom surface of the display panel. Edge-type backlights have a light source for generating light and a light guide panel or plate for controlling a propagation direction of the light. The light source is placed at a side of the light guide panel, and the light guide panel guides the light, which is transmitted from the light source, to the display panel. According to a shape of light beam generated by the light source, the light source is classified into a point light source, a linear light source and a surface light source, for example.

Close-eye display technology may be used to present information and images to a user as part of a virtual reality ("VR") or augmented reality ("AR") system. Such a close-eye display may be incorporated into a head-mounted display ("HMD") device or headset. HMDs can take many forms including helmets, visors, goggles, masks, glasses, and other head or eye wear. In some embodiments, the virtual reality and augmented reality systems comprise additional components, including a controller or computer that generates image information to drive the virtual reality or augmented reality environment. Such environments may be for a single user or for multiple users. HMDs in virtual reality systems and augmented reality systems can use a single information display or use multiple information displays to present images to a user. While these close-eye information displays can be oriented as direct-view, often the information displays are coupled with one or more lenses in the HMD. Such lenses can enhance the virtual reality or augmented reality experience.

BRIEF SUMMARY

One general aspect of the present disclosure includes a display device. The display device may include a display panel having a front surface and a rear surface. The device also includes an optics subsystem positioned in front of the display panel, the optics subsystem configured to focus light received from a portion of the front surface of the display panel onto an eye of a user, the portion of the front surface of the display panel being less than the entire front surface of the display panel. The device also includes a backlight assembly positioned behind the display panel which provides light to the display panel. The backlight assembly may include a light guide that includes a non-rectangular shaped front surface, a non-rectangular shaped rear surface opposite the front surface, and a perimeter side surface that spans between the front surface and the rear surface, the front surface having a surface area sized and dimensioned to approximate the portion of the display panel from which light is received and focused by the optical subsystem. The device also includes a light source positioned adjacent the perimeter side surface of the light guide, the light source operative to emit light into the light guide in a first direction that is parallel to the front surface of the light guide, the light guide receives the light from the light source in the first direction and directs the light in a second direction toward the display panel from the front surface of the light guide.

Implementations may include one or more of the following features. The front surface of the light guide may be circular in shape. The front surface of the light guide may have a shape of a polygon with five or more sides. The light source may include a plurality of laser diodes that each emit light of a different color. The perimeter side surface of the light guide may be polished to cause total internal reflection of the light emitted by the light source. The perimeter side surface of the light guide may be coated with or surrounded by a mirror element to cause total internal reflection of the light emitted by the light source. The display device may include a pattern of light extraction features positioned on the front surface of the light guide to diffuse light from the light guide toward the display panel. The pattern of light extraction features may have a density that increases radially from the perimeter side surface toward a center of the front surface of the light guide. The light source may include a laser diode that emits a laser beam that reflects multiple times inside the light guide via total internal reflection, and the pattern of light extraction features may be defined such that the density of light extraction features is relatively lower proximate determined paths the laser beam travels within the light guide before the first n reflections, where n is an integer less than or equal to 10. The light source may include a laser diode that emits a laser beam that reflects inside the light guide via total internal reflection, and the pattern of light extraction features may include a first pattern multiplexed with a second pattern, where, for the first pattern, the density of light extraction features increases radially from the perimeter side surface toward a center of the front surface of the light guide, and, for the second pattern, the density of light extraction features is relatively lower proximate determined paths the laser beam travels within the light guide before the first n reflections, where n is an integer. The backlight assembly further may include a reflective surface positioned proximate the rear surface of the light guide. The backlight assembly further may include an optical diffuser film positioned between the front surface of the light guide and the rear surface of the display panel. The light source may be coupled to the light guide via an optically clear adhesive. The light source may include a laser diode, and the backlight assembly further may include a lens positioned in front of the laser diode, where the lens may include a collimator lens or a spreader lens. The light source may include a plurality of light emitting diodes (LEDs) spaced apart around the perimeter side surface of the light guide. The LEDs may be carried on a flexible circuit board that extends around at least a portion of the perimeter side surface of the light guide. The LEDs may be carried on a rigid circuit board that extends around at least a portion of the perimeter side surface of the light guide. Implementations of the described techniques may include hardware, a method or process, or computer software on a computer-accessible medium.

One general aspect includes a head-mounted display device. The head-mounted display device includes a first display device and a second display device. Each of the first and second display devices may include a display panel having a front surface and a rear surface. The device may also include an optics subsystem positioned in front of the display panel, the optics subsystem configured to focus light received from a portion of the front surface of the display panel onto an eye of a user, the portion of the front surface of the display panel being less than the entire front surface of the display panel. The device also includes a backlight assembly positioned behind the display panel which provides light to the display panel. The backlight assembly may include a light guide that may include a non-rectangular shaped front surface, a non-rectangular shaped rear surface opposite the front surface, and a perimeter side surface that spans between the front surface and the rear surface. The device may also include a laser diode positioned adjacent the perimeter side surface of the light guide, the laser diode operative to emit light into the light guide in a first direction that is parallel to the front surface of the light guide, the light guide receives the light from the diode in the first direction, where the light reflects inside the light guide via total internal reflection. The device may also include a pattern of light extraction features positioned on the front surface of the light guide to diffuse light from the light guide toward the display panel. Other embodiments of this aspect include corresponding computer systems, apparatus, and computer programs recorded on one or more computer storage devices, each configured to perform the actions of the methods.

Implementations may include one or more of the following features. The light guide may be circular in shape. The laser diode may include three laser diodes, each of the three laser diodes emitting a different color of light.

One general aspect includes a display device. The display device includes a display panel having a front surface and a rear surface. The device also includes an optics subsystem positioned in front of the display panel, the optics subsystem configured to focus light received from a portion of the front surface of the display panel onto an eye of a user, the portion of the front surface of the display panel being less than the entire front surface of the display panel. The device also includes a backlight assembly positioned behind the display panel which provides light to the display panel. The backlight assembly may include a light guide that may include a non-rectangular shaped front surface, a non-rectangular shaped rear surface opposite the front surface, and a perimeter side surface that spans between the front surface and the rear surface. The device may also include a laser diode positioned adjacent the perimeter side surface of the light guide, the laser diode operative to emit light into the light guide in a first direction that is parallel to the front surface of the light guide, the light guide receives the light from the diode in the first direction, where the light reflects inside the light guide via total internal reflection. The device also includes a pattern of light extraction features positioned on the front surface of the light guide to diffuse light from the light guide toward the display panel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to displays for electronic devices, such as head-mounted display devices. Methods and systems relating generally to information displays, and more particularly to systems and methods for backlight assemblies for information displays that provide significantly improved efficiency. A backlight assembly may include a light guide that is sized and dimensioned to illuminate only a portion of a display panel that is actually imaged or focused by an optics system. The backlight assembly may include a light source, such as one or more laser diodes (e.g., red laser diode, green laser diode, and blue laser diode), that directs a beam of light into the light guide wherein the beam reflects via total internal reflection. The light guide may include a plurality of light extraction features or homogenizers configured to diffuse light toward the display panel, such as a liquid crystal display (LCD) panel.

Liquid crystal displays (LCDs) are a common example of non-emissive displays that require an independent light source, referred to as a backlight unit or assembly. Backlight assemblies provide such displays with homogeneous and bright light with appropriate color characteristics. Backlight technology has become more important recently due to the advent of edge-lit light emitting diode (LED) backlights which have allowed displays to be made much slimmer than previous displays while also reducing power consumption. To meet energy regulations or to satisfy other requirements, it is important for backlight assemblies to be as efficient as possible. As discussed further below, the present disclosure improves the performance of backlight assemblies by providing a backlight assembly that illuminates only a portion of the display panel that is imaged by optics, and therefore viewed by an eye of a user, resulting in a very efficient backlight relative to existing technology.

Figure 1:
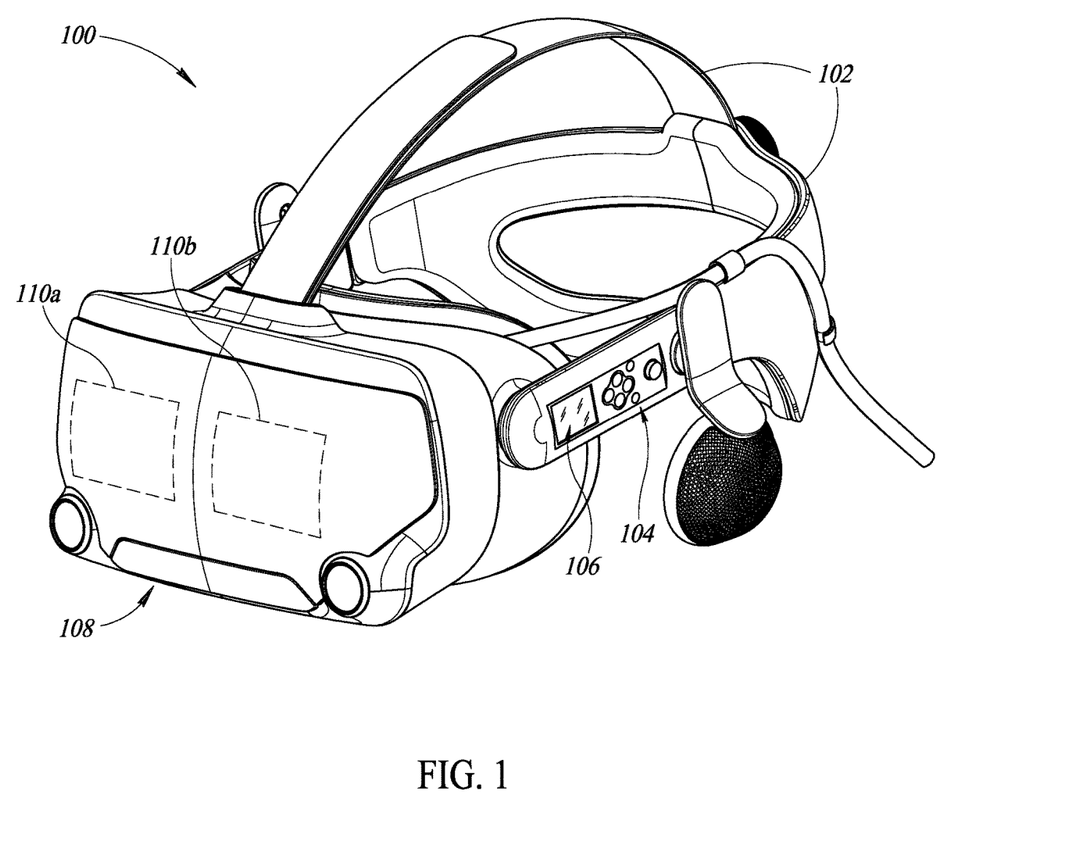
FIG. 1 is an example of a head-mounted display device that includes dual display panels, according to one illustrated implementation.

FIG. 1 illustrates a non-limiting example of an electronic device in the form of a head-mounted display device 100, which may optionally be coupled to a video rendering computing system via a wired or wireless connection to provide a virtual reality display to a human user. In operation, the user wears the HMD device 100 on their head, secured via one or more straps 101, and receives displayed information at each eye via displays 102a and 102b supported by a support structure 116 of the HMD device from the computing system of a simulated environment different from the actual physical environment, with the computing system acting as an image rendering system that supplies images of the simulated environment to the HMD device for display to the user, such as images generated by a game program (not shown) and/or other software program (not shown) executing on the computing system. The user is further able to move around the actual physical environment in this example, and may further have one or more I/O ("input/output") devices to allow the user to further interact with the simulated environment, such as hand-held controllers that are communicatively coupled to the computing system via wired or wireless connections. The HMD device may include one or more user interfaces 104 and 106 that allow the user to provide input to the HMD device 100 or computing system coupled to the HMD device. As the user moves location and/or changes orientation of the HMD device 100, the position of the HMD device may be tracked, such as to allow a corresponding portion of the simulated environment to be displayed to the user on the HMD device, and the controllers may further employ similar techniques to use in tracking the positions of the controllers (and to optionally use that information to assist in determining and/or verifying the position of the HMD device). After the tracked position of the HMD device 100 is known, corresponding information is transmitted to the computing system, which uses the tracked position information to generate one or more next images of the simulated environment to display to the user via the displays 102a and 102b.

Figure 2:
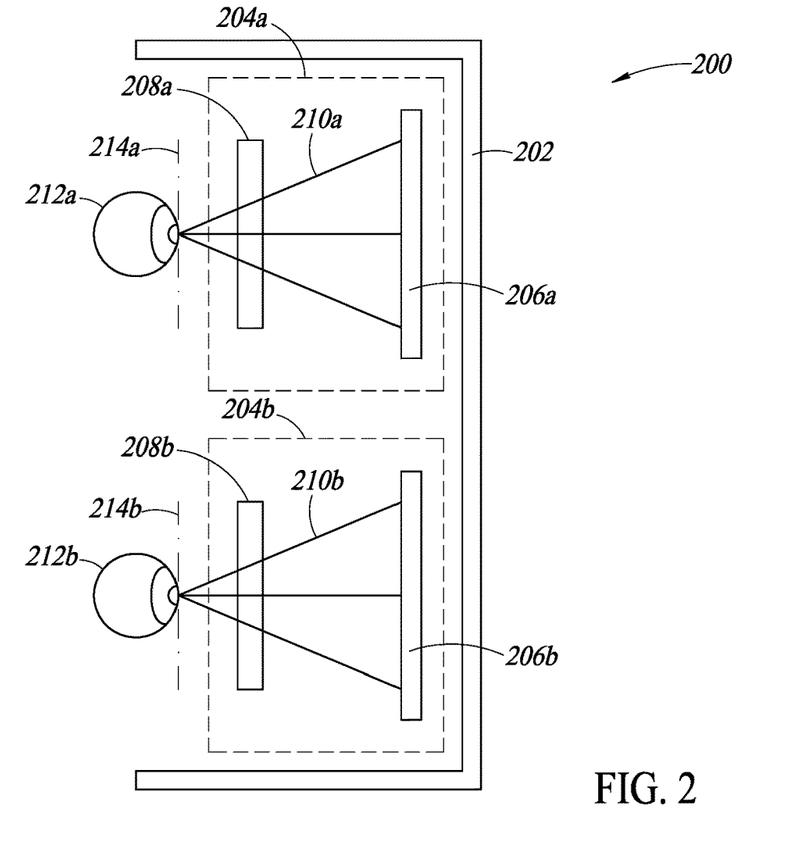
FIG. 2 shows a top sectional view of a head-mounted display device, according to one non-limiting illustrated implementation.

FIG. 2 shows a top sectional view of a head-mounted display device 200, according to one non-limiting illustrated implementation. The head-mounted display device 200 includes a rigid housing or body 202 that carries a left optical system 204a and a right optical system 204b. The left optical system 204a includes a display device 206a to provide images to the left eye 212a of a user. Similarly, the right optical system 204b includes a display device 206b to provide images to the right eye 212b of the user. The left optical system 204a and the right optical system 204b may be similar or identical to each other. Thus, the discussion below with reference to the optical system 204a may apply equally to both of the optical systems 204a and 204b.

The optical system 204a provides images to an exit pupil 214a, which is the location in the front of the body 202 where the user's left eye 212a is positioned when wearing the head-mounted display device 200. The optical system 204a includes the display 206a and an optics subsystem 208a. The optics subsystem 208a focuses and magnifies the light from the display device 206a and may also correct for one or more types of optical errors, such as distortion, aberrations, etc. The optics subsystem 208a directs the image light to the exit pupil 214a for presentation to the left eye 212a of the user.

When the user wears the head-mounted display device 200, the user's nose is positioned between the two optical subsystems 204a and 204b. Each of the display systems 206a and 206b may include a rectangular (e.g., square) display panel or matrix, such as an LCD panel. As discussed further below with reference to FIG. 4, the display systems 206a and 206b may each include a backlight assembly that is configured to provide light to only a portion of the display panel that is actually imaged or focused by the optics subsystem 208a. In this way, pixels of the display panel that are not imaged by the optics subsystem 208a are not provided with light from a backlight, thereby reducing the amount of light required to be generated by the backlight, thereby significantly improving efficiency of the backlight.

Figure 3:
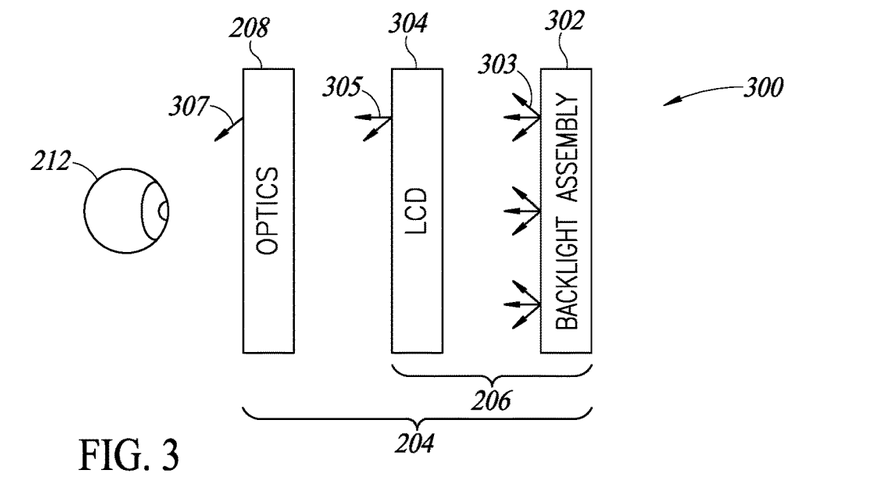
FIG. 3 shows another sectional view of a head-mounted display device, according to one non-limiting illustrated implementation.

FIG. 3 depicts an example backlit LCD display 300 with a backlight assembly in a head-mounted display configuration, such as in a virtual reality or augmented reality headset. FIG. 3 shows a backlight assembly 302 emitting light 303 that passes through an LCD panel 304 thereby displaying a visible image. A diffuser layer (not shown) may also be provided to produce more uniform light. Light 305 exiting the LCD panel 304 then passes through the optics subsystem or lens assembly 208, which may include one or more lenses. In certain embodiments, the lens(es) in the optics subsystem 208 may be conventional spherical, aspherical, Fresnel, or any other type of imaging lens. The optics subsystem 208 may have lens faces of a single type, or could be combinations of lens types. In some implementations, the optics subsystem 208 may have a pancake configuration, which may comprise a polarization-based reflective or refractive optical system. In this case, the optics subsystem 208 may comprise an assembly of optical elements configured to direct light 307 from LCD 304 toward the user's eye 212 using on-axis optical folding based, at least in part, on polarization of the light. The optics subsystem 208 may include various optical elements other than a lens. For example, the optics subsystem 208 may include at least one polarizing beam splitter and a substrate comprising twisted liquid crystal elements. The twisted liquid crystal elements may be configured to modify phase of the light within the optics subsystem 208. Light 307 exits the optics subsystem 208 directed towards the user's eye 212. In some embodiments, the light 307 creates an eye box of approximately 10 millimeters (e.g., 5-25 mm, etc.). Those of ordinary skill will realize that FIG. 3 is not meant to depict the physical design or layout of an HMD system, but rather the general flow of light among the depicted components in some embodiments.

In certain embodiments, a head-mounted display is designed to be seen by both the left and right eyes of the user. This can be achieved using separate left and right LCD displays, as shown in FIGS. 1 and 2, or can be achieved using a single LCD display. Similarly, the virtual reality or augmented reality headset could comprise a single optics subsystem or it could use individual left and right optics subsystems 208a and 208b, as shown in FIG. 2.

Figure 4:
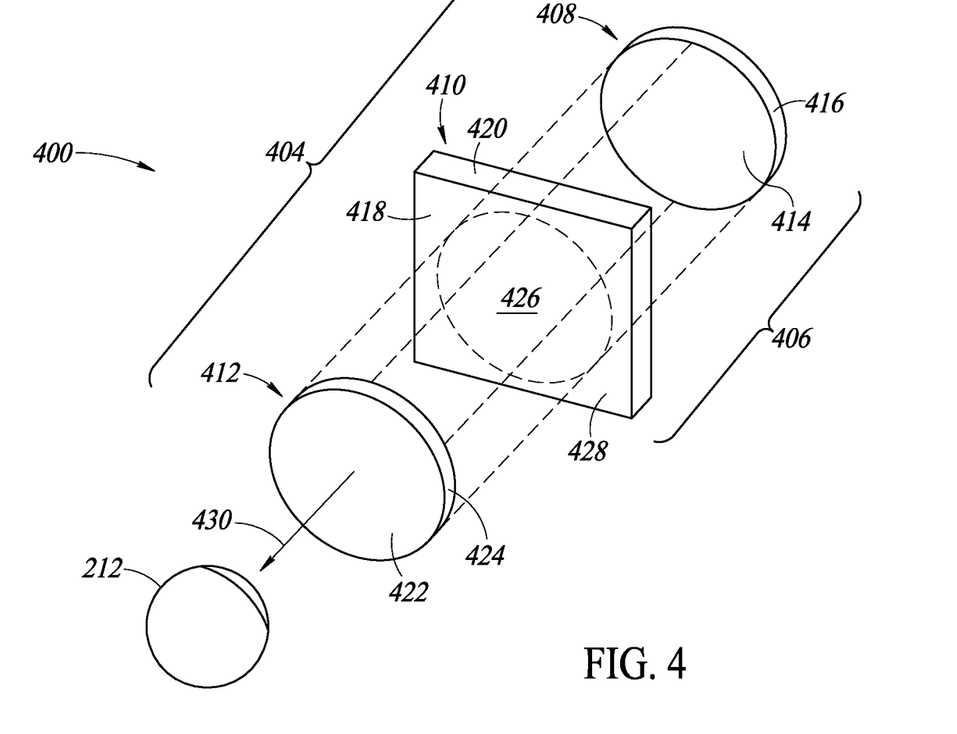
FIG. 4 is an exploded perspective view of a display device, according to one non-limiting illustrated implementation.

FIG. 4 is an exploded perspective view of an example display device 400 according to one or more implementations of the present disclosure. The display device 400 includes an optical system 404 that includes a display system 406 and an optics subsystem 412. The display system 406 includes a circular-shaped light guide 408 of a backlight assembly and a square-shaped display panel 410, such as an LCD panel. For explanatory purposes, other components of the backlight assembly are not shown in FIG. 4. In operation, the light guide 408 of the backlight receives light and emits the received light toward the user's eye 212 in a direction indicated by arrow 430. The display panel 410 is positioned between the light guide 408 and the optics subsystem 412, and controls the amount of light that passes from the light guide on a per pixel basis via suitable control circuitry. The light that passes through the display panel 410 is focused by the optics subsystem 412 onto the eye 212 of the user.

The light guide 408 includes a front surface 414, a rear surface (not shown), and a perimeter side surface 416 that connects the front surface to the rear surface. Similarly, the display panel 410 includes a front surface 418, a rear surface (not shown), and a perimeter side surface 420 that connects the front surface to the rear surface. The optics subsystem 412 includes a front surface 422, a rear surface (not shown), and a perimeter side surface 424 that connects the front surface to the rear surface.

The display panel 410 includes a central portion 426 (indicated by a dashed circle in FIG. 4) that is imaged or focused by the optics subsystem 412, and a peripheral region 428 that is not imaged or focused by the optics subsystem 412. The particular size and shape of the central portion or region 426 of the display panel 410 is dependent on the particular design and configuration of the optics subsystem 412. As shown, the central portion 426 may be circular in shape. In at least some implementations, the central portion may have a different shape.

In the illustrated embodiment, at least the front surface 414 of the light guide 408 has a surface area sized and dimensioned to approximate (e.g., within 5 percent, within 20 percent) the size of the portion 426 of the display panel 410 from which light is received and focused by the optics subsystem 412. In this example, the front surface 414 has a circular shape. In other implementations, the front surface 414 of the light guide 408 may have a shape of a polygon with five or more sides (e.g., pentagon, hexagon, octagon, irregularly-shaped polygon), while still approximating the portion 426 of the display panel 410 that is imaged by the optics subsystem 412 compared to a light guide that has approximately the same shape as the LCD panel 410.

Figure 5:
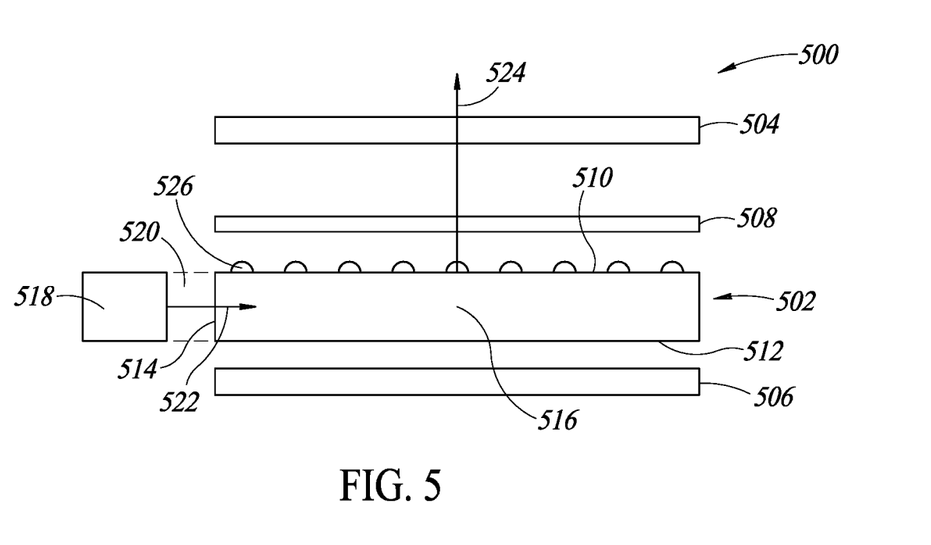
FIG. 5 is a sectional side view of a display device, according to one non-limiting illustrated implementation.

FIG. 5 is a sectional side view of a display device 500, in accordance with one or more embodiments of the present disclosure. The display device 500 includes a display panel 504, such as an LCD panel. The display device 500 further includes a backlight assembly including a light guide 502 having a front surface 510, a rear surface 12, and a perimeter side surface 514 that spans between the front surface and the rear surface. As discussed above, the light guide 502 may be sized and dimensioned to provide light to the display panel 504 substantially only in a region that is imaged by focusing optics (e.g., optics subsystems 208 or 412). In at least some implementations, the backlight assembly further includes a reflective or mirrored layer or surface 506 positioned proximate to or coated on the rear surface 512 of the light guide 502, and may include one or more optical film layers 508 (e.g., diffuser layer) positioned between the light guide 502 and the display panel 504.

A light source 518 may be positioned adjacent the perimeter side surface 514. In at least some implementations, the light source 518 may be coupled into the perimeter side surface 514 by an optically clear adhesive 520 (e.g., epoxy) or other suitable coupler. As discussed further below, the light source 518 may be one or more laser light sources (e.g., red, green, and blue semiconductor laser diodes) that emits a beam 522 of light having particular dimensions (e.g., 1-5 mm×1-5 mm square, Gaussian, etc.) in a first direction toward a center 516 of the light guide 502. The light source 518 may comprise multiple laser sources that each emit light having a different color (e.g., red, green, blue). The light source 518 may comprise one or more other light sources or optional lenses that provide light to the light guide 502. In at least some implementations, the light source 518 may include a plurality of LEDs (e.g., white LEDs) that surround at least a portion of the perimeter side surface 514 of the light guide 502.

As the light beam 522 propagates through the light guide 502 in the first direction (horizontal as shown in FIG. 5), the light guide operates to direct light in a second direction shown by arrow 524 (upward as shown in FIG. 5) through the display panel 504. The backlight may be operative to distribute the light at least somewhat uniformly across the pixels of the display panel that are within a region or portion that is imaged by focusing optics, as discussed above.

The light guide 502 may be constructed from a transparent glass material, a transparent plastic material (e.g., polymethyl methacrylate (PMMA), polycarbonate (PC)), or any other suitable material. The optional optical film layer or stack 508 may include a diffuser layer that facilitates the uniform distribution of light from the light guide 502 across the pixels of the display panel 504. The optical film layer 508 may additionally or alternatively include one or more other layers, such as a reflective polarizer layer or a brightness enhancement film (BEF) layer, etc.

The light guide 502 may include a plurality of light extraction features 526, also referred to as homogenizer bumps or dimples, which facilitate projecting light from within the light guide 502 upward toward the display panel 504, as shown by the arrow 524. In the illustrated embodiment, the light extraction features 526 are positioned on the top or front surface 510 of the light guide 502, but in other embodiments the light extraction features may be alternatively or additionally positioned on the bottom or rear surface 512 of the light guide. Further, although the light extraction features are shown as protruding bumps, in at least some implementations some or all of the light extraction features may include dimples a the surface of the light guide 502 instead. Further, in at least some implementations the light guide 502 may include a variable thickness with or without light extraction features on the top surface, the bottom surface, or both.

Figure 6:
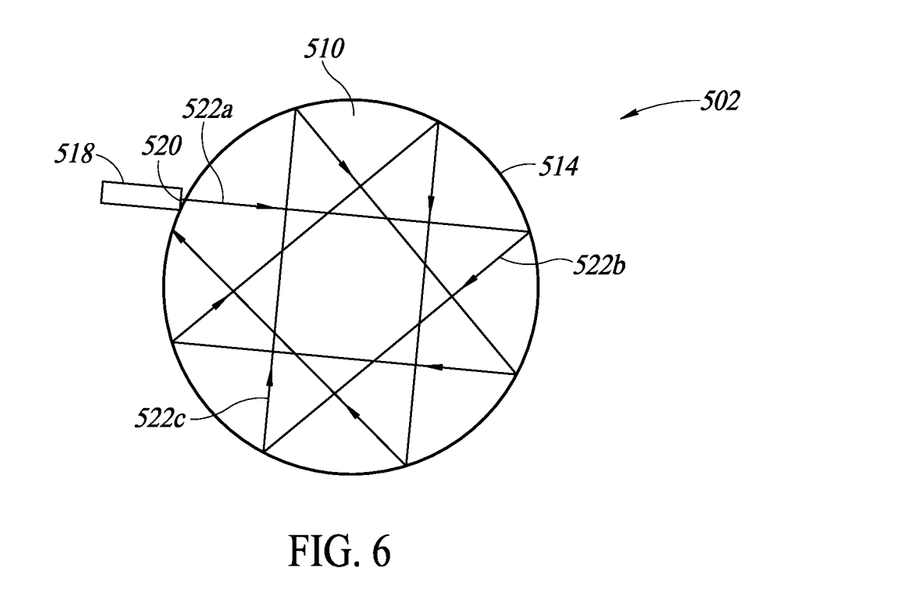
FIG. 6 is top view of a backlight assembly that includes a light guide and light source, according to one non-limiting illustrated implementation.

FIG. 6 is top view of the circular-shaped light guide 502 and the light source 518 also shown in FIG. 5. As shown, the light source 518 (e.g., three laser diodes) emits a beam 522*a* into the light guide 502 which reflects via total internal reflection off of the perimeter side surface 514 of the light guide. The first reflected beam is labeled as beam 522*b*, and the second reflected beam is labeled as beam 522*c*. The light from the light source 518 continues to reflect numerous times within the light guide 502 to provide a substantially uniform light across the front surface 510 of the light guide, where the light is extracted by the light extraction features 526 (FIG. 5). As shown, the light source 518 is positioned and oriented introduce the beam 522*a* into the light guide 502 at an angle where the first N reflected beams form a "star" pattern, which provides a more uniform distribution of light within the light guide.

Figure 7A:
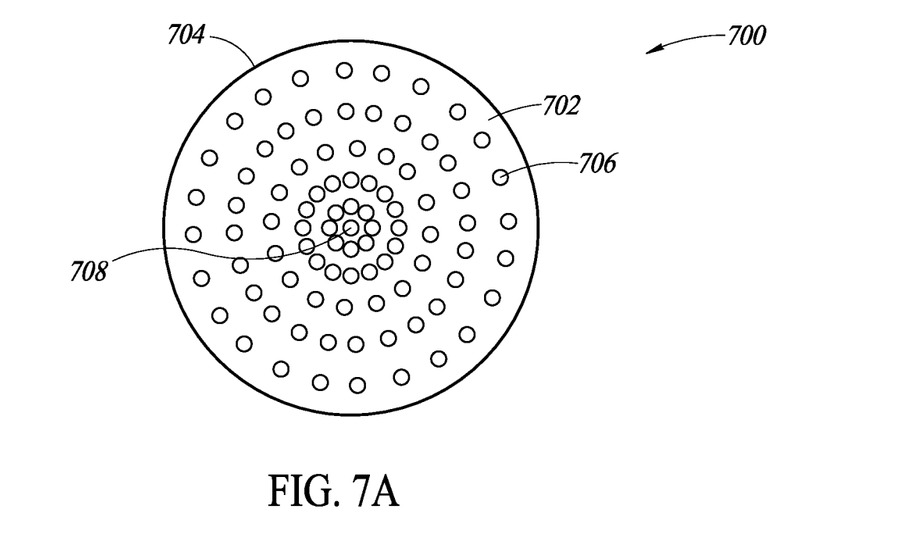
FIG. 7A is a top view of a backlight assembly that includes a light guide that includes a first pattern of light extraction features, according to one non-limiting illustrated implementation.

FIG. 7A is a top view of a light guide 700 of a backlight assembly that includes a first pattern of light extraction features 706 on a front or top surface 702 of the light guide. In this example, the density of the light extraction features 706 increases from a perimeter side surface 704 of the light guide 700 toward a center 708 of the light guide. In this way, more light is extracted from the center 708 of the light guide 700 than from the peripheral region, which is advantageous because the user's attention is normally directed more to the center of the display panel.

Figure 7B:
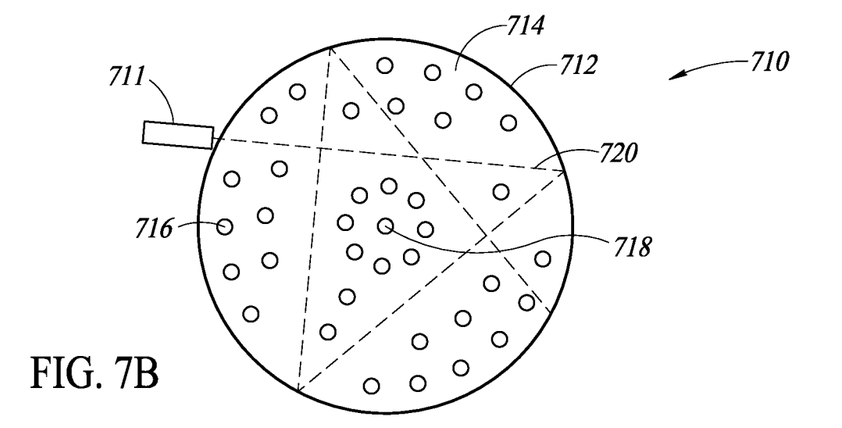
FIG. 7B is a top view of a backlight assembly that includes a light guide that includes a second pattern of light extraction features, according to one non-limiting illustrated implementation.

FIG. 7B is a top view of a light guide 710 of a backlight assembly that includes a second pattern of light extraction features 716. In this example, a laser diode source 711 is provided that emits a beam 720 into the light guide 710, which reflects off a perimeter side surface 712 via total internal reflection in a star pattern within the light guide. In this embodiment, the second pattern of light extraction features 716 is defined such that the density of light extraction features is relatively lower proximate determined paths that the laser beam 720 travels within the light guide 710 before the first N reflections, wherein N is an integer less than or equal to 10 (e.g., 3, 5, 7, 10). In this example, 4 beam paths and 3 reflections are shown, and the light extraction features 716 are not positioned over the known paths of the first 4 beam paths or 3 reflections. Since the beam of light is most intense during the first few paths, keeping the light extraction features away from such paths prevents a large amount of light from being extracted along the first few paths, which may otherwise reduce the uniformity of the backlight.

Figure 7C:
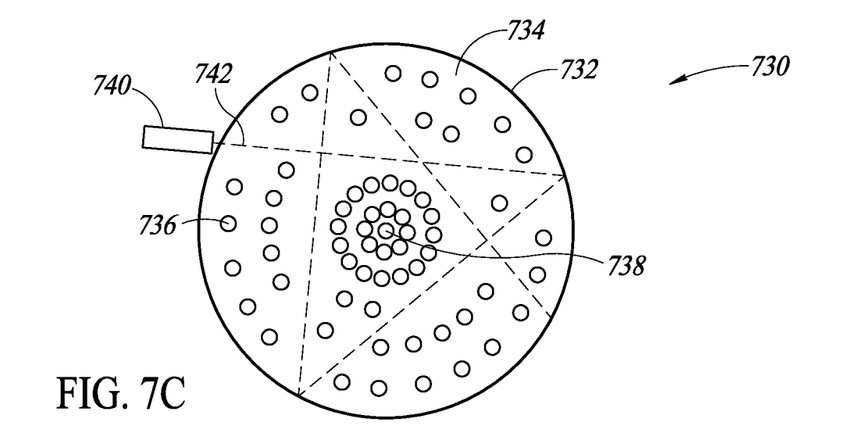
FIG. 7C is a top view of a backlight assembly that includes a light guide that includes a third pattern of light extraction features, according to one non-limiting illustrated implementation.

FIG. 7C is a top view of a light guide 730 of a backlight assembly that includes a third pattern of light extraction features 736. In this example, a laser diode source 740 is provided that emits a beam 742 into the light guide 730, which reflects off a perimeter side surface 732 via total internal reflection within the light guide. In this embodiment, the third pattern comprises the first pattern (shown in FIG. 7A) multiplexed with the second pattern (shown in FIG. 7B), to provide a density of light extraction features 736 that is higher toward a center 738 of the light guide 730, while also having a lower density of light extraction features proximate a first N paths or reflections of the light beam, where the beam is relatively brighter than subsequent paths.

Figure 8:
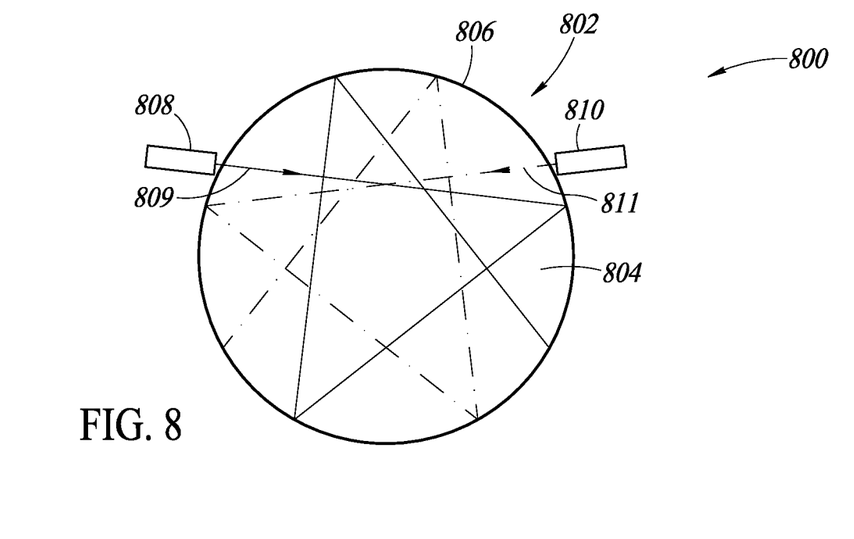
FIG. 8 is top view of a backlight assembly that includes a light guide and two light sources, wherein the light sources include laser diodes, according to one non-limiting illustrated implementation.

FIG. 8 is top view of a backlight assembly 800 that includes a light guide 802 and two light sources 808 and 810, wherein the light sources include laser diodes. The light sources 808 and 810 are positioned on opposite sides of the light guide 802, although this is not required. The light source 808 emits a beam 806 that reflects off a perimeter side surface 806 via total internal reflection within the light guide 802 below the front surface 804 of the light guide. Similarly, the light source 810 emits a beam 811 that reflects off a perimeter side surface 806 via total internal reflection within the light guide 802 below the front surface 804 of the light guide. Although two light sources 808 and 810 are shown, it should be appreciated that in other implementations more than two light sources may be provided.

Figure 9:
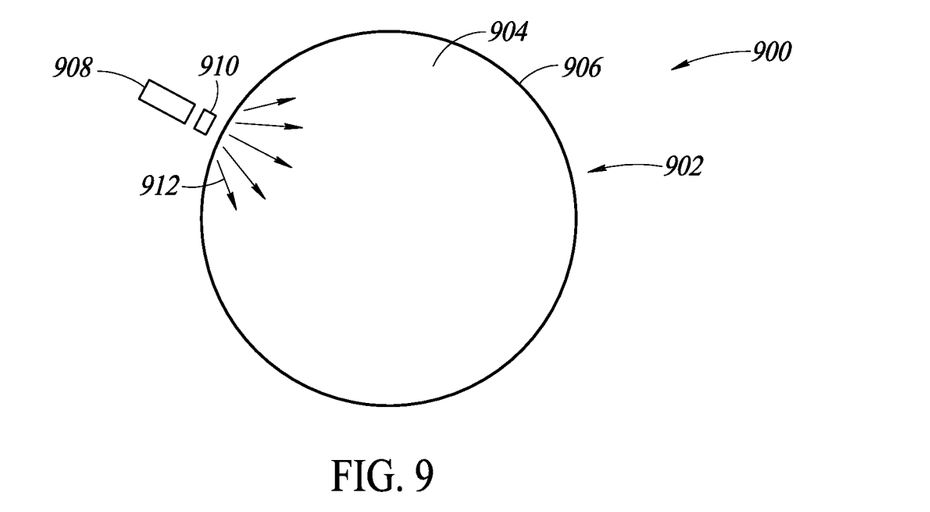
FIG. 9 is top view of a backlight assembly that includes a light guide, a light source, and a spreader lens, according to one non-limiting illustrated implementation.

FIG. 9 is top view of a backlight assembly 900 that includes a light guide 902 having a top surface 904, a bottom surface (not shown), and a perimeter side surface 906. The backlight assembly 900 further includes a light source 908 in the form of one or more laser diodes, as discussed above. In this illustrated embodiment, a spreader lens 910 (e.g., a cylindrical lens) is provided to distribute light 912 over a broad angle within the light guide 902. As non-limiting examples, the spreader lens 910 may be operative to spread the light 912 from the light source 908 at an angle of 30 degrees, 60 degrees, 120 degrees, etc., in a direction that is parallel to the top or front surface 904 of the light guide 902. In at least some implementations, instead of a spreader lens, the lens 910 may comprise a collimating lens or one or more other types of lenses.

Figure 10:
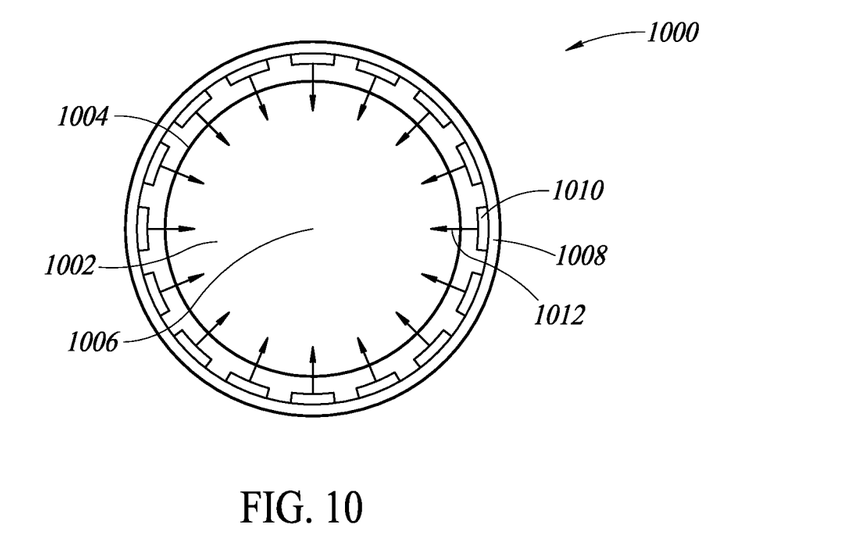
FIG. 10 is top view of a backlight assembly that includes a light guide and light sources, wherein the light sources include a plurality of LEDs mounted on a flexible circuit board that surrounds a perimeter of the light guide, according to one non-limiting illustrated implementation.

FIG. 10 is top view of a backlight assembly 1000 that includes a light guide 1002 comprising a perimeter side surface 1004, as discussed above. In this embodiment, the backlight assembly 1000 includes a plurality of LEDs 1010 (e.g., white LEDs) that are mounted on a flexible circuit board 1008 that surrounds the perimeter side surface 1004 of the light guide 1002. The LEDs 1010 are each positioned to direct light 1012 toward a center 1006 of the light guide 1002. In at least some implementations, a flexible circuit board carrying LEDs may be provided that surrounds less than the entire perimeter side surface 1004 of the light guide 1002.

Figure 11:
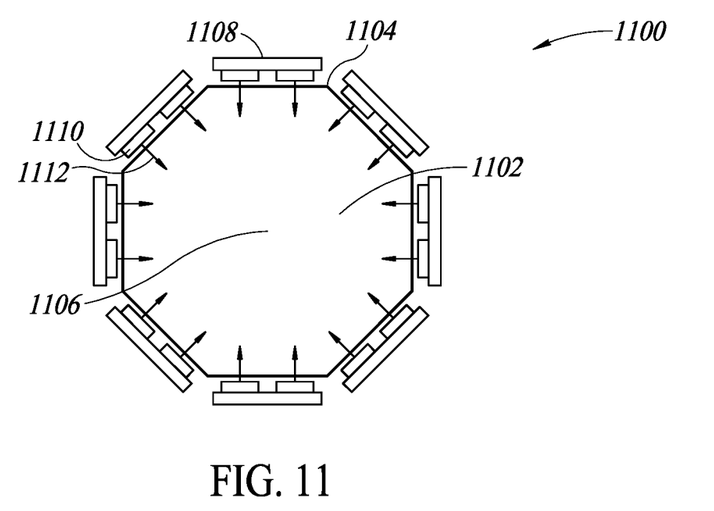
FIG. 11 is top view of a backlight assembly that includes a light guide and light sources, wherein the light sources include a plurality of LEDs mounted on rigid circuit boards that surround a perimeter of the light guide, according to one non-limiting illustrated implementation.

FIG. 11 is top view of a backlight assembly 1100 that includes a light guide 1102 comprising a perimeter side surface 1104. In this embodiment, the perimeter side surface 1104 is octagon-shaped, although it should be appreciated that other regular or non-regular polygon shapes may be used instead. The backlight assembly 1100 includes a plurality of LEDs 1110 (e.g., white LEDs) that are mounted respective rigid circuit boards 1108 that are each adjacent one side of the perimeter side surface 1104 of the light guide 1102. The LEDs 1110 are each positioned to direct light 1112 toward a center 1106 of the light guide 1102, as discussed above with reference to other embodiments. In at least some implementations, one or more rigid circuit boards carrying LEDs may be provided that surrounds less than the entire perimeter side surface 1104 of the light guide 1102.

Figure 12:
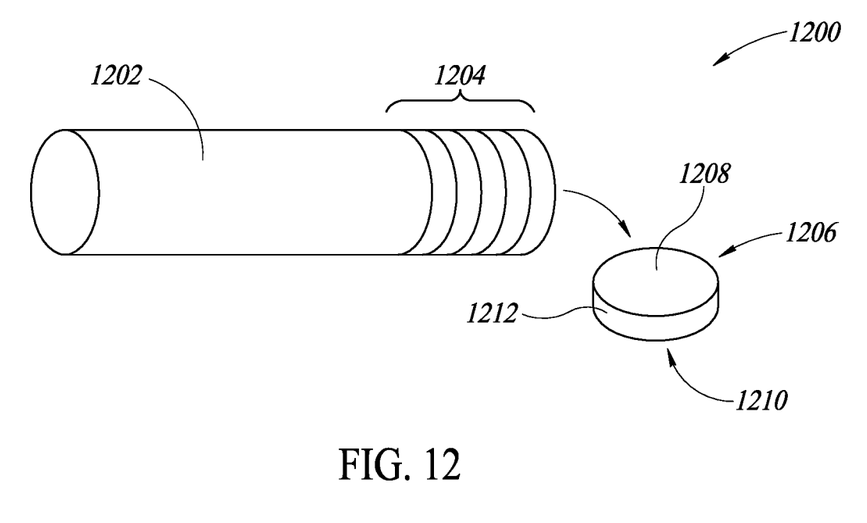
FIG. 12 shows a cylindrically-shaped block of material which may be used to form a plurality of light guides, according to one non-limiting illustrated implementation.

FIG. 12 shows a cylindrical block 1200 of material which may be used to form a plurality of individual light guides 1204, such as any of the light guides discussed herein. Although a cylinder shape is illustrated as an example, in other implementations other shapes may be used (e.g., a block of material having a polygon cross section). As discussed above, the block 1200 may be constructed from a transparent glass material or a transparent plastic material (e.g., polymethyl methacrylate (PMMA), polycarbonate (PC)), or other suitable material for a light guide. In at least some implementations, the outer surface 1202 of the block 1200 may be processed to facilitate total internal reflection of light within the resulting light guides. As an example, the outer surface 1202 may be polished so it is a smooth surface, or it may be coated or wrapped with a reflective or mirrored layer. Once processed, the block 1200 may be cut into several wafers 1204 that can be used as light guides of the present disclosure. An example resulting light guide 1206 is shown which includes a top or front surface 1208, a bottom or rear surface 1210, and a perimeter side surface 1212, as discussed above. Additionally or alternatively, the perimeter surface 1212 of the individual light guide 1206 may be processed (e.g., polished, mirror applied) after the block 1200 has been cut to provide a surface that facilitates total internal reflection of the light beam inside the light guide 1206.

Those of skill in the art will recognize that many of the methods or algorithms set out herein may employ additional acts, may omit some acts, and/or may execute acts in a different order than specified. The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A backlight assembly, comprising:
a light guide comprising a front surface, a rear surface opposite the front surface, and a perimeter side surface that spans between the front surface and the rear surface;
a light source positioned adjacent the perimeter side surface of the light guide, the light source operative to emit light into the light guide;
a display panel receiving light emitted by the light guide; and
an optics system for receiving and focusing light from a portion of the display panel,
wherein a surface area of the front surface of the light guide is sized and dimensioned to match the size and dimension of a focused portion of the display panel from which light is received and focused by the optics system such that light is provided by the light guide to only the focused portion of the display panel.

2. The backlight assembly of claim 1 wherein the light guide receives light from the light source in a first direction and directs the light in a second direction toward the display panel from the front surface of the light guide.

3. The backlight assembly of claim 1 wherein the front surface of the light guide is non-rectangular in shape.

4. The backlight assembly of claim 1 wherein the front surface of the light guide is circular in shape.

5. The backlight assembly of claim 1 wherein the front surface of the light guide has a shape of a polygon with five or more sides.

6. The backlight assembly of claim 1 wherein the light source comprises a plurality of laser diodes that each emit light of a different color.

7. The backlight assembly of claim 1 wherein the perimeter side surface of the light guide is polished to cause total internal reflection of the light emitted by the light source.

8. The backlight assembly of claim 1 wherein the perimeter side surface of the light guide is coated with or surrounded by a mirror element to cause total internal reflection of the light emitted by the light source.

9. The backlight assembly of claim 1 wherein backlight assembly further comprises a reflective surface positioned proximate the rear surface of the light guide.

10. The backlight assembly of claim 1 wherein the backlight assembly further comprises an optical diffuser film positioned between the front surface of the light guide and the rear surface of the display panel.

11. The backlight assembly of claim 1 wherein the light source is coupled to the light guide via an optically clear adhesive.

12. The backlight assembly of claim 1 wherein the light source comprises a laser diode, and the backlight assembly further comprises a lens positioned in front of the laser diode, wherein the lens comprises a spreader lens.

13. The backlight assembly of claim 1 wherein the light source comprises a plurality of light emitting diodes (LEDs) spaced apart around the perimeter side surface of the light guide.

14. The backlight assembly of claim 13 wherein the LEDs are carried on a flexible circuit board that extends around at least a portion of the perimeter side surface of the light guide.

15. The backlight assembly of claim 13 wherein the LEDs are carried on a rigid circuit board that extends around at least a portion of the perimeter side surface of the light guide.

16. The backlight assembly of claim 1, further comprising a pattern of light extraction features positioned on the front surface of the light guide to diffuse light from the light guide toward the display panel.

17. The backlight assembly of claim 16 wherein the pattern of light extraction features has a density that increases in a direction away from the perimeter side surface and towards a center of the front surface of the light guide.

18. The backlight assembly of claim 16, wherein the light source comprises a laser diode that emits a laser beam that reflects multiple times inside the light guide via total internal reflection, and the pattern of light extraction features is defined such that the density of light extraction features is relatively lower proximate determined paths the laser beam travels within the light guide before a first N reflections, wherein N is an integer less than or equal to 10.

19. The backlight assembly of claim 16, wherein the light source comprises a laser diode that emits a laser beam that reflects inside the light guide via total internal reflection, and the pattern of light extraction features comprises a first pattern multiplexed with a second pattern, wherein, for the first pattern, the density of light extraction features increases in a direction away from the perimeter side surface and towards a center of the front surface of the light guide, and, for the second pattern, the density of light extraction features is relatively lower proximate determined paths the laser beam travels within the light guide before the first N reflections, wherein N is an integer less than or equal to 10.

20. A backlight assembly, comprising:
a light guide comprising a front surface, a rear surface opposite the front surface, and a perimeter side surface that spans between the front surface and the rear surface;
a laser diode positioned adjacent the perimeter side surface of the light guide, the laser diode operative to emit light into the light guide in a first direction;
a display panel receiving light emitted by the light guide; and
an optics system for receiving and focusing light from a portion of the display panel,
wherein a surface area of the front surface of the light guide is sized and dimensioned to match the size and dimension of a focused portion of the display panel from which light is received and focused by the optics system such that light is provided by the light guide to only the focused portion of the display panel.

21. The backlight assembly of claim 20, wherein the light guide includes a plurality of light extraction features configured to diffuse light from the light guide toward the display panel.

22. The backlight assembly of claim 20 wherein the light guide is circular in shape.

23. The backlight assembly of claim 20 wherein the laser diode comprises three laser diodes, each of the three laser diodes emitting a different color of light.

24. A backlight assembly, comprising:
a light guide comprising a front surface, a rear surface opposite the front surface, and a perimeter side surface that spans between the front surface and the rear surface;
a laser diode positioned adjacent the perimeter side surface of the light guide, the laser diode operative to emit light into the light guide;
a plurality of light extraction features positioned in or on the light guide to diffuse light emitted by the light guide;
a display panel receiving light emitted by the light guide; and
an optics system for receiving and focusing light from a portion of the display panel,
wherein a surface area of the front surface of the light guide is sized and dimensioned to match the size and dimension of a focused portion of the display panel from which light is received and focused by the optics system such that light is provided by the light guide to only the focused portion of the display panel.

* * * * *